(12) United States Patent
Kim et al.

(10) Patent No.: US 9,973,442 B1
(45) Date of Patent: May 15, 2018

(54) CALCULATING REACHABILITY INFORMATION IN MULTI-STAGE NETWORKS USING MATRIX OPERATIONS

(71) Applicant: Amazon Technologies, Inc., Seattle, WA (US)

(72) Inventors: Minsung Kim, San Jose, CA (US); Ashi Ramachandran Sudhakumari, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 14/869,168

(22) Filed: Sep. 29, 2015

(51) Int. Cl.
*H04L 12/933* (2013.01)

(52) U.S. Cl.
CPC .................. *H04L 49/101* (2013.01)

(58) Field of Classification Search
CPC ...................................... H04L 49/101
See application file for complete search history.

(56) References Cited

U.S. PATENT DOCUMENTS 5,754,120 A * 5/1998 Argentati ................ H04L 49/25
340/2.22
2004/0240437 A1 12/2004 Fraser
2006/0209816 A1 * 9/2006 Li ............................ H04Q 3/68
370/386
2010/0150147 A1 6/2010 Khanduri
2012/0117295 A1 5/2012 Gunnam
2012/0170575 A1 7/2012 Mehra
2013/0163607 A1 6/2013 Shukla et al.
2014/0376546 A1 12/2014 Miller et al.
2015/0003477 A1 1/2015 Baeckler
2015/0088936 A1 * 3/2015 Wang ..................... G06F 17/16
707/802

OTHER PUBLICATIONS

Wikipedia, "Clos network," <https://en.wikipedia.org/wiki/Clos_network>, 6 pages (accessed Aug. 7, 2015).

* cited by examiner

*Primary Examiner* — Noel R Beharry
*Assistant Examiner* — Sharmin Chowdhury
(74) *Attorney, Agent, or Firm* — Klarquist Sparkman, LLP

(57) ABSTRACT

Techniques and solutions are provided for calculating reachability matrices for multi-stage networks using matrix operations. For example, link status information can be obtained for network devices of the multi-stage network. Using the link status information, binary link state matrices can be determined representing connectivity between the stages of the multi-stage network. Binary reachability matrices can then be calculated using the binary link state matrices. The binary reachability matrices can be used in deciding where to forward network packets for destination devices.

20 Claims, 8 Drawing Sheets

CALCULATING REACHABILITY INFORMATION IN MULTI-STAGE NETWORKS USING MATRIX OPERATIONS

BACKGROUND

In order to communicate network traffic between a source device and a destination device, packet forwarding networks forward packets between networking devices, such as routers and switches, along the path between the source and the destination. The particular path taken between the source and the destination is determined by a network protocol, such as open shortest path first (OSPF).

While routing protocols such as OSPF can be used to make routing decisions, such routing protocols are complex and require significant computing resources. For example, in a dense network fabric with a large number of routers and switches, a traditional routing protocol such as OSPF can have difficulty making routing decisions efficiently.

DETAILED DESCRIPTION

Overview

Figure 1:
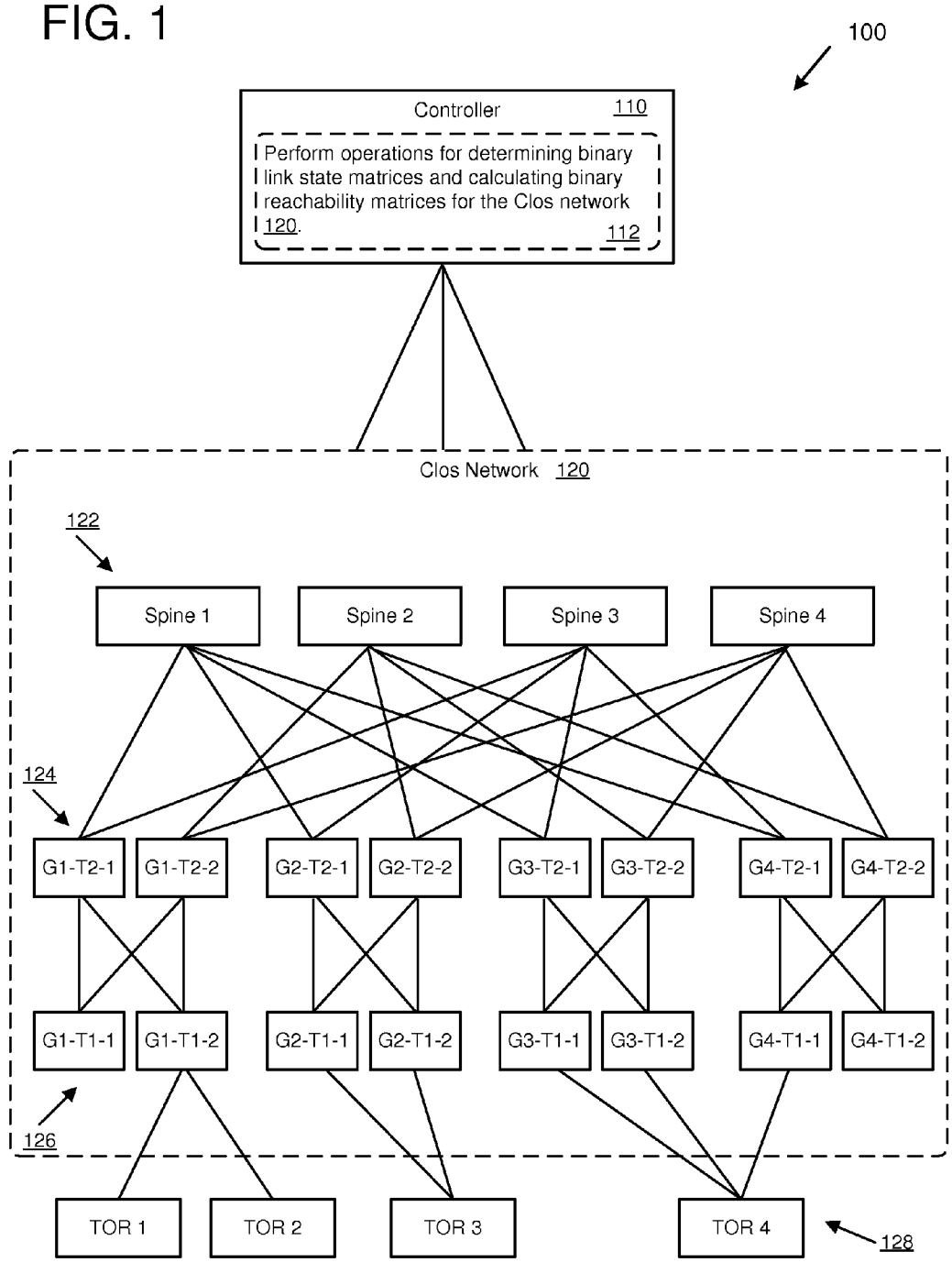
FIG. 1 is a diagram of an example environment in which reachability information can be calculated for a Clos network.

The following description is directed to techniques and solutions for calculating reachability matrices for multi-stage networks (e.g., Clos networks and/or other types of multi-stage networks) using matrix operations. For example, link status information can be obtained for network devices of the multi-stage network. Using the link status information, binary link state matrices can be determined representing connectivity between the stages of the multi-stage network. Binary reachability matrices can then be calculated, using matrix multiplication operations, from the binary link state matrices. The binary reachability matrices can be used in deciding where to forward network packets for destination devices.

The technologies described herein are implemented within the context of a multi-stage network with a plurality of stages. A multi-stage network is a network in which network devices (routers and/or switches) are organized into a plurality of stages. One type of multi-stage network is a tiered network such as a Clos network (also called a Clos network fabric or a Clos fabric). The network devices in a given stage forward traffic between the network devices in the previous stage and network devices in the next stage. In some types of multi-stage networks, the network devices in a given stage are fully meshed with the network devices in an adjacent stage (e.g., each router in a first stage is connected to every router in a second stage). In other types of multi-stage networks, the network connections between stages are not fully meshed (e.g., a router in a given stage may be connected to every other router in an adjacent stage). As another example, groups of network devices in adjacent stages can be interconnected within the group, but not interconnected between groups.

In the figures and description herein, a specific type of 3-tier 2×2 Clos network (which is a 5-stage Clos network when unfolded) is used to describe the various technologies. This specific type of Clos network is used as an example network environment to illustrate operation of the technologies described herein. However, the technologies described herein can be implemented in any type of multi-stage network (e.g., a fully meshed multi-stage network or a multi-stage network using other interconnection strategies).

Managing routing within a multi-stage network can be difficult. A multi-stage network operating as a network fabric within a data center can have many network devices. For example, a multi-stage network within a data center could have 3,000 routing devices and 50,000 links between devices. A traditional routing protocol such as OSPF can have problems (e.g., reduced efficiency, routing errors or failures, etc.) in scaling to such a dense network fabric.

In some implementations, the technologies described herein are used to create a control plane protocol managed by a controller (e.g., a server, router, or other type of computing device). The control plane protocol can then be used to make packet forwarding decisions within the multi-stage network (e.g., instead of, or in addition to, a traditional routing protocol such as OSPF). The controller can obtain connectivity information from the network devices of the multi-stage network, compute convergence information about the multi-stage network fabric, and provide the convergence information to the network devices of the multi-stage network to use for directing network traffic. The controller can perform these operations offline (e.g., as an external resource outside the multi-stage network).

The matrix multiplication operations described herein can be used to calculate reachability matrices (e.g., binary matrix multiplication operations to calculate binary reachability matrices) and make network packet forwarding decisions in a more efficient manner than a routing protocol such as OSPF. For example, calculating reachability matrices using matrix multiplication operations can scale to a dense multi-stage network fabric with many routing devices and associated links. In addition, because the technologies described herein use fewer computing resources (e.g., processing power and memory), the network devices of the multi-stage network can be less capable (e.g., have slower processors, have less memory, etc.).

In some implementations, an external controller device performs at least some of the operations for calculating reachability matrices for a multi-stage network. By using an external controller, reachability matrices can be efficiently calculated and provided to the network devices of the multi-stage network for use in making network packet forwarding decisions. Because the operations are performed by the controller device, computing resource requirements can be reduced for the network devices within the multi-stage network. In addition, a controller device can utilize specialized hardware to perform the matrix operations even more efficiently. For example, a controller device can comprise graphics processing hardware (e.g., graphics processing units (GPUs)) and/or other specialized hardware can perform matrix operations even more efficiently than a traditional central processing unit (CPU).

Environments for Calculating Reachability Matrices

In any of the implementations described herein, reachability matrices (e.g., binary reachability matrices) can be calculated for a multi-stage network (e.g., for a Clos network or another type of tiered network). For example, the network devices (routers and/or switches) of the multi-stage network can use matrix operations to calculate binary reachability matrices. In some implementations, a computing device external to the multi-stage network (e.g., a controller device) receives link information from the network devices of the multi-stage network, calculates binary reachability matrices using the link information and the multi-stage topology, and provides the binary reachability matrices to the network devices of the multi-stage network.

FIG. 1 is a diagram of an example environment 100 in which reachability matrices can be calculated for a Clos network. In FIG. 1, an example Clos network 120 is depicted. The Clos network 120 is a specific type of 3-tier 2×2 Clos network (which is a 5-stage Clos network when unfolded) which is used as a simplified example in order to illustrate operation of the various technologies described herein. The first tier is the row of network devices (routers and/or switches) at 126. The second tier is the row of network devices depicted at 124. The third tier, also called the spine tier, is the row of network devices depicted at 122. Other implementations can use a Clos network with a different number of tiers and/or with a different connection strategy than that used in the example Clos network 120. Other implementations can also use a multi-stage network other than a Clos network.

In the example Clos network 120, the first tier and second tier network devices are organized into two by two (2×2) groups. As depicted, there are four groups. The first group groups the network devices G1-T1-1, G1-T1-2, G1-T2-1, and G1-T2-2, and the remaining groups are organized similarly. The designation of each network device in the first tier and second tier identifies which tier and which group the network device belongs to. For example, the network device G1-T1-1 is part of the first group (G1), is in the first tier (T1), and is the first network device in the first group and the first tier (1).

In the example Clos network 120, the network devices of each group are fully interconnected. However, in other implementations, different interconnection strategies can be used. Also, in the example Clos network 120, each group has four network devices (two in the first tier and two in the second tier). However, other implementations may have a different number of network devices in a group (e.g., 16 network devices, 32 network devices, or another number of network devices). For example, a group could have 16 network devices (8 in the first tier and 8 in the second tier) in a fully interconnected arrangement (where each network device in the first tier is connected to every network device in the second tier within a given group). In addition, other implementations may not organize network devices in different tiers into groups.

In the example Clos network 120, the second tier and their tier (the spine tier) are connected in a particular arrangement. Specifically, the spine network devices alternate between connecting to the first network device or the second network device in a given group in the second tier. For example, the network devices designated Spine 1 and Spine 3 are connected to the first network device in each group of the second tier, while the network devices designated Spine 2 and Spine 4 are connected to the second network device in each group of the second tier. Other implementations can use a different connection strategy between the second and third tiers.

In the example environment 100, a number of network devices are depicted that send and receive network traffic via the Clos network 120. These network devices are called "top of rack" (TOR) devices. In some implementations, the TOR devices are network switches that connect to the hosts of a server rack within a data center environment and that communicate data within the data center environment using the Clos network 120. There are four TOR network devices depicted at 128. Each TOR network device connects to one or more of the first tier network devices within the Clos network 120. For example, TOR 3 connects to the network devices designated G2-T1-1 and G2-T1-2. Instead of, or in addition to, TOR network devices, other computing devices can connect to the Clos network 120.

In the example environment 100, a controller 110 performs a number of operations for managing routing activity for the Clos network 120. For example, as depicted at 112, the controller 110 can perform operations for determining binary link state matrices and for calculating binary reachability matrices for the Clos network 120.

For example, the controller 110 can be a server, router, or another type of computing device external to the Clos network 120 that manages routing activity performed within the Clos network 120. The controller 110 can connect to the network devices of the Clos network 120 via a management plane. For example, in some implementations the controller 110 connects to each network device of the Clos network 120 via a management link (e.g., network port located at each network device of the Clos network 120).

Reachability Matrices

In the technologies described herein, binary reachability matrices are calculated for a multi-stage network. Reachability matrices define which network devices can communicate (e.g., forward network packets) to which other network devices.

Figure 2:
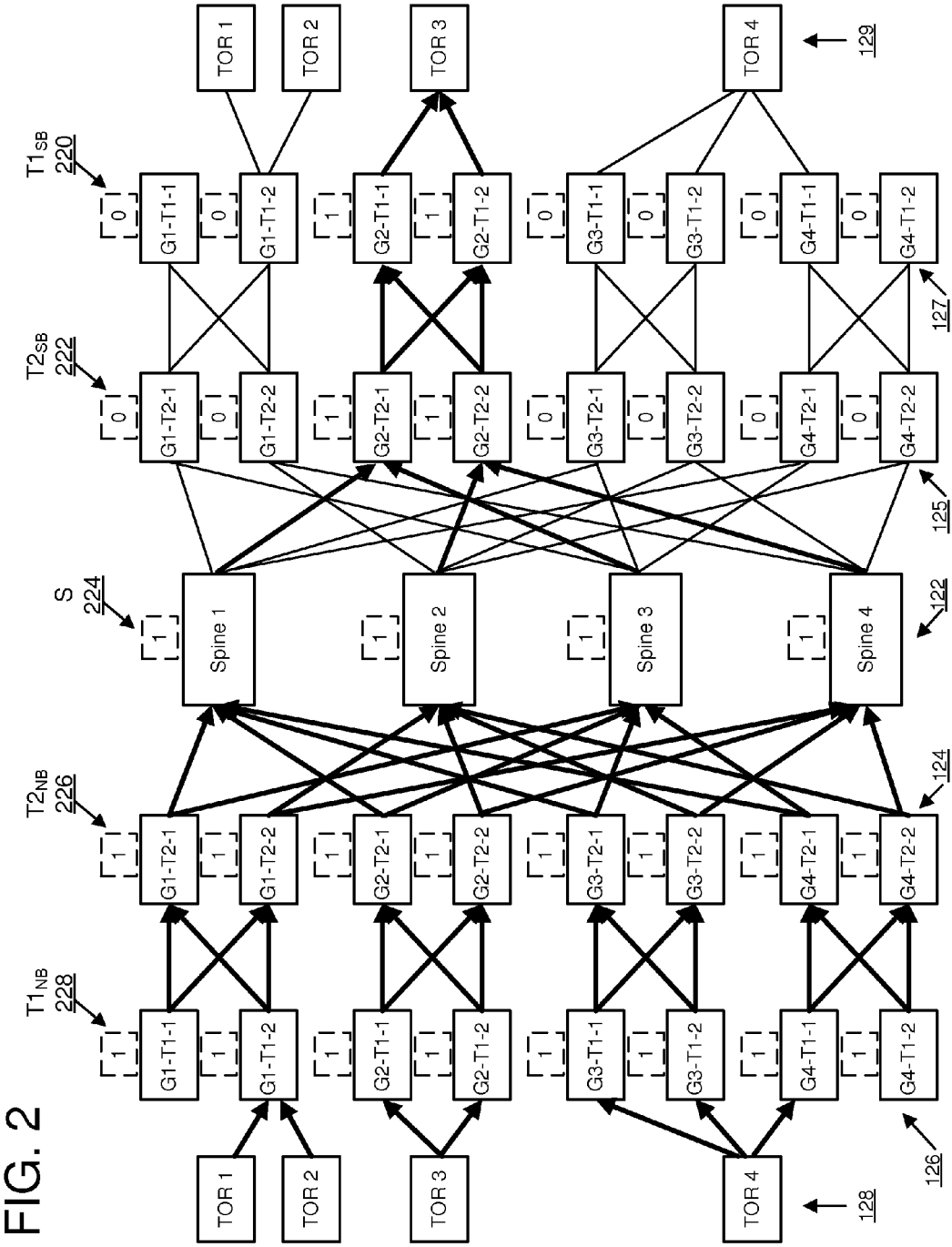
FIG. 2 is a diagram depicting an example unfolded Clos network with reachability matrices.

In order to illustrate how reachability matrices are defined and calculated, FIG. 2 is provided. FIG. 2 depicts the example Clos network 120 that has been unfolded from a 3-tier representation into a 5-stage unfolded representation. Specifically, in the unfolded Clos network, the network connections between network devices have been split from two-way connections (as depicted in the Clos network 120 represented in FIG. 1) into two one-way connections. The two one-way connections are referred to north bound (NB) connections and south bound (SB) connections. The north bound connections (the left-hand side of the unfolded Clos network) carry network traffic from the TOR devices (depicted at 128 on the left), to the tier one devices (depicted at 126 on the left), to the tier two devices (depicted at 124 on the left), and then to the tier three (spine) devices (depicted at 122). The north bound connections can also be referred to as uplink connections. The south bound connections (the right-hand side of the unfolded Clos network) carry network traffic from the tier three (spine) devices (depicted at 122), to the tier two devices (depicted at 125 on the right), to the tier one devices (depicted at 127 on the right), and then to the TOR devices (depicted at 129 on the right). By unfolding the Clos network, network traffic can be more easily represented as it travels from a source TOR device through the Clos network and back to a destination TOR device. It should be noted that the same TOR devices, first tier devices, and second tier devices are depicted both on the left hand side and right hand side of FIG. 2. Specifically, the TOR devices depicted at 128 and 129 are the same TOR devices, just depicted in two different locations to show the Clos network in an unfolded manner (similarly, the first tier devices 126 and 127 are the same devices, and the second tier devices 124 and 125 are the same devices).

In FIG. 2, reachability matrices are shown for the five stages of the 5-stage unfolded Clos network. Reachability matrices are binary column matrices that represent which network devices on each stage can forward traffic to a destination (e.g., one or more TORs). In other words, a given reachability matrix for a given stage defines which routing devices of the given stage can forward network packets to a given destination or destinations. Each stage has its own reachability matrix.

In FIG. 2, reachability matrices are depicted for a destination of the TOR 3 network device. In order to determine the reachability matrices for TOR 3, reachability for the last stage is determined. The $T1_{SB}$ 220 (first tier in the south bound direction, which is the last stage in the 5-stage unfolded Clos network) reachability matrix is determined, as depicted by the dashed line boxes above each routing device in the first tier for the south bound stage. Specifically, a given matrix location is set to a zero if the corresponding network device cannot forward network packets directly to TOR 3, and set to a one if the corresponding network device can forward network packets directly to TOR 3. As depicted, there are two network devices that can forward network packets directly to TOR 3 (G2-T1-1 and G2-T1-2), which is also illustrated by the bold arrows. Therefore, the matrix elements for G2-T1-1 and G2-T1-2 are set to one, while the others are set to zero. The elements of the binary column matrix for $T1_{SB}$ 220 are (0 0 1 1 0 0 0 0).

Working backwards from the last stage, the other reachability matrices can be calculated for the TOR 3 destination. The second tier south bound reachability matrix is depicted at $T2_{SB}$ 222. The spine reachability matrix is depicted at S 224. The second tier north bound reachability matrix is depicted at $T2_{NB}$ 226. The first tier north bound reachability matrix is depicted at $T1_{NB}$ 228. Details of calculating the reachability matrices are described in further detail below.

While FIG. 2 illustrates the technology using a Clos network, the same technique can be applied to any type of tiered network with a plurality of tiers. Specifically, the tiered network can be represented in an unfolded state, as a plurality of stages, in which the network connections between network devices have been split from two-way connections (in the tiered representation) into two one-way connections (in the unfolded representation), as illustrated in FIG. 2 with regard to the example Clos network. The two one-way connections are referred to north bound connections and south bound connections. As with the 3-tier Clos network depicted in FIG. 2, a tiered network with three tiers would have five stages. As another example, a tiered network with four tiers would have seven stages.

Link State Matrices

In the technologies described herein, link state matrices are determined for a multi-stage network. Link state matrices represent which links within the multi-stage network are up and which links are down. Link state matrices can be used when calculating reachability matrices.

With reference to FIG. 2, the below link state matrix (in table format) represents which links within the unfolded Clos network are up, and which are down, between the first tier and second tier network devices in the south bound direction (between the network devices depicted at 125 and 127). Links which are up are have a value of one and links which are down have a value of zero. In addition, links which do not exist are entered as zero. As can be seen in Table 1 below, all of the existing links between the tier one and tier two network devices are up.

TABLE 1

Example Link State Matrix

|  | G1-T2-1 | G1-T2-2 | G2-T2-1 | G2-T2-2 | G3-T2-1 | G3-T2-2 | G4-T2-1 | G4-T2-2 |
| --- | --- | --- | --- | --- | --- | --- | --- | --- |
| G1-T1-1 | 1 | 1 | 0 | 0 | 0 | 0 | 0 | 0 |
| G1-T1-2 | 1 | 1 | 0 | 0 | 0 | 0 | 0 | 0 |
| G2-T1-1 | 0 | 0 | 1 | 1 | 0 | 0 | 0 | 0 |
| G2-T1-2 | 0 | 0 | 1 | 1 | 0 | 0 | 0 | 0 |
| G3-T1-1 | 0 | 0 | 0 | 0 | 1 | 1 | 0 | 0 |
| G3-T1-2 | 0 | 0 | 0 | 0 | 1 | 1 | 0 | 0 |
| G4-T1-1 | 0 | 0 | 0 | 0 | 0 | 0 | 1 | 1 |
| G4-T1-2 | 0 | 0 | 0 | 0 | 0 | 0 | 1 | 1 |

Figure 3:
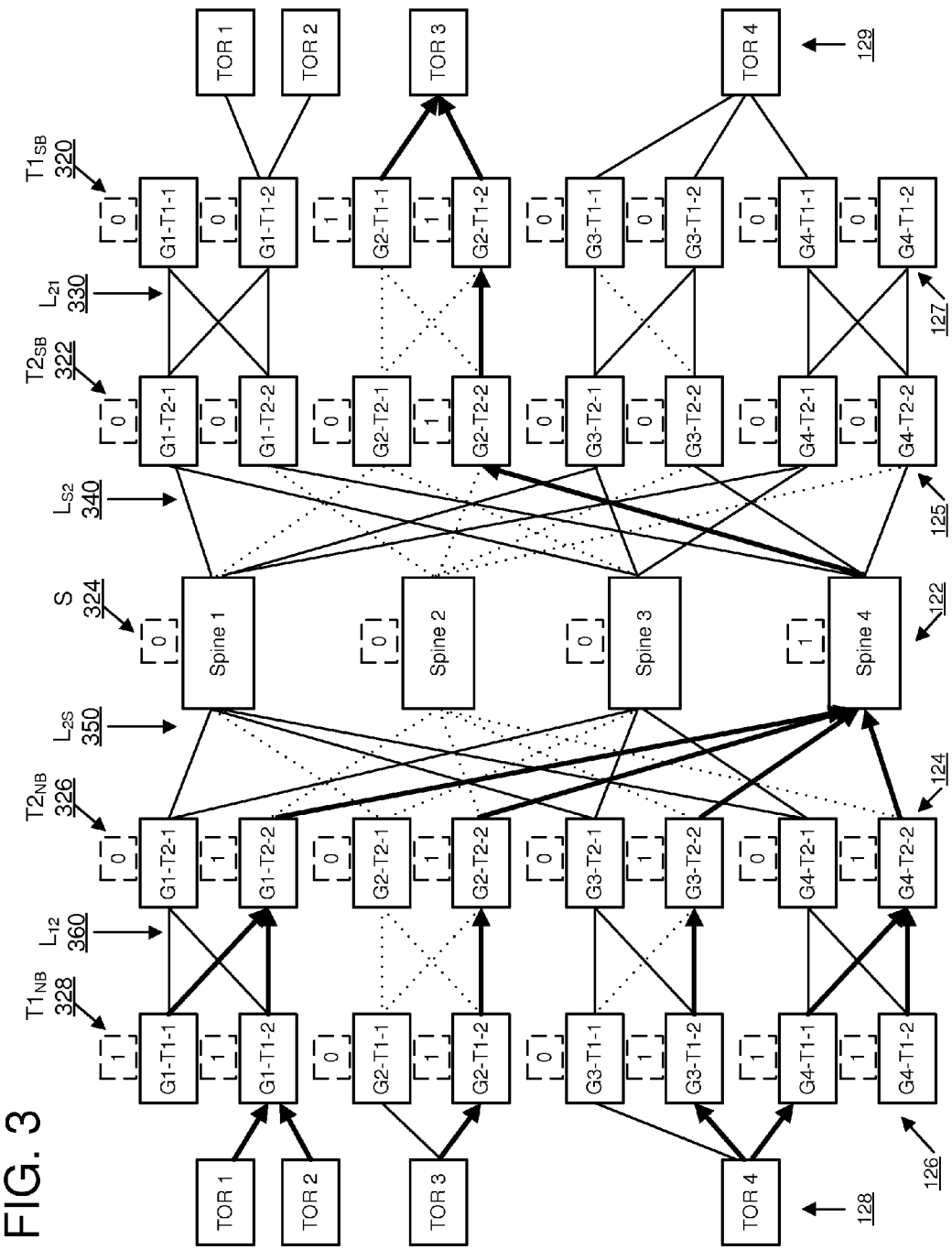
FIG. 3 is a diagram depicting an example unfolded Clos network with link state matrices and reachability matrices.

FIG. 3 depicts the example unfolded Clos network from FIG. 2 in which some of the links between the network devices are down. Specifically, the links that are down are depicted as dotted lines (e.g., between G2-T1-1 and G2-T2-1, between G2-T1-1 and G2-T2-2, and between G2-T1-2 and G2-T2-1), while the links that are up are depicted as solid lines. In this example unfolded Clos network, links have been marked down in a symmetric manner for ease of illustration, meaning that if a specific link is marked down then it is down for both north bound and south bound directions (e.g., the north bound link between G2-T1-1 and G2-T2-1, between 126 and 124, and the south bound link between G2-T2-1 and G2-T1-1, between 125 and 127, are both marked down). However, in some implementations, north bound and south bound links may be down independently.

FIG. 3 can be used to describe link state matrices in further detail in an unfolded Clos network in which some of links are down. As depicted in FIG. 3, there 5-stage unfolded Clos network has four link state matrices, $L_{21}$ 330, $L_{S2}$ 340, $L_{2S}$ 350, and $L_{12}$ 360. For the link state matrices, the rows are the source network devices and the columns are the destination network devices.

The $L_{21}$ 330 link state matrix is a binary matrix that represents whether a link is up or down (or not present) between the second tier 125 and the first tier 127 in the south bound direction. As depicted in FIG. 3, there are four links down between these tiers (between G2-T1-1 and G2-T2-1, between G2-T2-1 and G2-T1-2, between G2-T2-2 and G2-T1-1, and between G3-T2-2 and G3-T1-1). The $L_{21}$ 330 link state matrix is depicted below (in table format) as Table 2.

TABLE 2

Example Link State Matrix for $L_{21}$ 330

|  | G1-T1-1 | G1-T1-2 | G2-T1-1 | G2-T1-2 | G3-T1-1 | G3-T1-2 | G4-T1-1 | G4-T1-2 |
|---|---|---|---|---|---|---|---|---|
| G1-T2-1 | 1 | 1 | 0 | 0 | 0 | 0 | 0 | 0 |
| G1-T2-2 | 1 | 1 | 0 | 0 | 0 | 0 | 0 | 0 |
| G2-T2-1 | 0 | 0 | 0 | 0 | 0 | 0 | 0 | 0 |
| G2-T2-2 | 0 | 0 | 0 | 1 | 0 | 0 | 0 | 0 |
| G3-T2-1 | 0 | 0 | 0 | 0 | 1 | 1 | 0 | 0 |
| G3-T2-2 | 0 | 0 | 0 | 0 | 0 | 1 | 0 | 0 |
| G4-T2-1 | 0 | 0 | 0 | 0 | 0 | 0 | 1 | 1 |
| G4-T2-2 | 0 | 0 | 0 | 0 | 0 | 0 | 1 | 1 |

Working backward (from right to left), the next link state matrix depicted in FIG. 3 is $L_{S2}$ 340. The $L_{S2}$ 340 link state matrix is a binary matrix that represents whether a link is up or down (or not present) between the spine tier 122 and the second tier 125 in the south bound direction. The $L_{S2}$ 340 link state matrix is depicted below (in table format) as Table 3.

TABLE 3

Example Link State Matrix for $L_{S2}$ 340

|  | G1-T2-1 | G1-T2-2 | G2-T2-1 | G2-T2-2 | G3-T2-1 | G3-T2-2 | G4-T2-1 | G4-T2-2 |
|---|---|---|---|---|---|---|---|---|
| Spine 1 | 1 | 0 | 0 | 0 | 1 | 0 | 1 | 0 |
| Spine 2 | 0 | 0 | 0 | 0 | 0 | 0 | 0 | 0 |
| Spine 3 | 1 | 0 | 0 | 0 | 1 | 0 | 1 | 0 |
| Spine 4 | 0 | 1 | 0 | 1 | 0 | 1 | 0 | 1 |

The next link state matrix is $L_{2S}$ 350. The $L_{2S}$ 350 link state matrix is a binary matrix that represents whether a link is up or down (or not present) between the second tier 124 in the north bound direction and the spine tier 122. The $L_{2S}$ 350 link state matrix can be obtained by transposing the $L_{S2}$ 340 link state matrix when links are down symmetrically.

The final link state matrix is $L_{12}$ 360. The $L_{12}$ 360 link state matrix is a binary matrix that represents whether a link is up or down (or not present) between the first tier 126 and the second tier 124 in the north bound direction. The $L_{12}$ 360 link state matrix can be obtained by transposing the $L_{21}$ 330 link state matrix when links are down symmetrically Calculating Reachability Matrices In some implementations, a set of reachability matrices are calculated for one or more destination devices that are reachable by the same network devices in the last, or final, stage in the south bound direction. The set of reachability matrices defines how network packets can be communicated to the one or more destination devices via the multi-stage network. Using the set of reachability matrices, the network devices of the multi-stage network can determine the next device for forwarding network packets so that the network packets can ultimately be delivered to the one or more destination devices.

In some implementations, in order to calculate a set of reachability matrices for one or more destination devices, the reachability matrix for the final stage in the south bound direction is first determined. With reference to FIG. 3, link status information can be obtained indicating which links are present between the first tier network devices in the south bound direction (designated 127) for one or more selected TOR destination devices. As depicted in FIG. 3, the destination has been set to TOR 3, which is connected to G2-T1-1 and G2-T1-2. Therefore, the reachability matrix for $T1_{SB}$ 320 is the column of values (0 0 1 1 0 0 0 0).

Matrix multiplication operations are then used to calculate the reachability matrices for the other stages working backward from the final reachability matrix (backward from $T1_{SB}$ 320 in this example). The equation used to calculate the next reachability matrix is:

$$T2_{SB} = L_{21} \times T1_{SB}$$

In other words, the reachability matrix for the second tier south bound ($T2_{SB}$ 322) is equal to the link state matrix ($L_{21}$ 330 indicating which links are up or down (or not present) between the second tier 125 and first tier 127 south bound) multiplied by the reachability matrix for the first tier south bound ($T1_{SB}$ 320). Using the values in Table 2 above for link state matrix $L_{21}$ 330 (reflecting the link up/down state depicted in FIG. 3) and the values depicted in FIG. 3 for the reachability matrix $T1_{SB}$ 320, the following matrix multiplication (Calculation 1) calculates $T2_{SB}$ 322.

$$\begin{pmatrix} 1 & 1 & 0 & 0 & 0 & 0 & 0 & 0 \\ 1 & 1 & 0 & 0 & 0 & 0 & 0 & 0 \\ 0 & 0 & 0 & 0 & 0 & 0 & 0 & 0 \\ 0 & 0 & 0 & 1 & 0 & 0 & 0 & 0 \\ 0 & 0 & 0 & 0 & 1 & 1 & 0 & 0 \\ 0 & 0 & 0 & 0 & 0 & 1 & 0 & 0 \\ 0 & 0 & 0 & 0 & 0 & 0 & 1 & 1 \\ 0 & 0 & 0 & 0 & 0 & 0 & 1 & 1 \end{pmatrix} \times \begin{pmatrix} 0 \\ 0 \\ 1 \\ 1 \\ 0 \\ 0 \\ 0 \\ 0 \end{pmatrix} = \begin{pmatrix} 0 \\ 0 \\ 0 \\ 1 \\ 0 \\ 0 \\ 0 \\ 0 \end{pmatrix}$$

$L_{21} \times T1_{SB} = T2_{SB}$   Calculation 1

According to Calculation 1 above, $T2_{SB}$ 322 is the column of values (0 0 0 1 0 0 0 0), indicating that only one of the second tier south bound network devices can forward network packets to the destination (TOR 3 in this example). This result is depicted in FIG. 3 as the values in the dashed boxes at $T2_{SB}$ 322. Also, the one network device that can forward network packets in the second tier south bound is G2-T2-2, as illustrated by the bold arrow.

The equation used to calculate the next reachability matrix is:

$$S = L_{S2} \times T2_{SB}$$

In other words, the reachability matrix for the spine tier (S 324) is equal to the link state matrix ($L_{S2}$ 340 indicating which links are up or down (or not present) between the spine tier 122 and second tier 125 south bound) multiplied by the reachability matrix for the second tier south bound ($T2_{SB}$ 322). Using the values in Table 3 above for link state matrix $L_{S2}$ 340 (reflecting the link up/down state depicted in FIG. 3) and the values calculated above in Calculation 1 for the reachability matrix $T2_{SB}$ 322, the following matrix multiplication (Calculation 2) calculates S 324.

$$\begin{pmatrix} 1 & 0 & 0 & 0 & 1 & 0 & 1 & 0 \\ 0 & 0 & 0 & 0 & 0 & 0 & 0 & 0 \\ 1 & 0 & 0 & 0 & 1 & 0 & 1 & 0 \\ 0 & 1 & 0 & 1 & 0 & 1 & 0 & 1 \end{pmatrix} \times \begin{pmatrix} 0 \\ 0 \\ 0 \\ 1 \\ 0 \\ 0 \\ 0 \\ 0 \end{pmatrix} = \begin{pmatrix} 0 \\ 0 \\ 0 \\ 1 \end{pmatrix}$$

$$L_{S2} \times T2_{SB} = S \quad \text{Calculation 2}$$

According to Calculation 2 above, the reachability matrix S 324 is the column of values (0 0 0 1), indicating that only the fourth network device (Spine 4) in the spine tier 122 can forward network packets to the destination. This result is depicted in FIG. 3 as the values in the dashed boxes at S 324.

The equation used to calculate the next reachability matrix is:

$$T2_{NB} = L_{2S} \times S$$

In other words, the reachability matrix for the second tier north bound ($T2_{NB}$ 326) is equal to the link state matrix ($L_{2S}$ 350 indicating which links are up or down (or not present) between the second tier 124 north bound and the spine tier 122) multiplied by the reachability matrix for the spine tier (S 324). Because the links in the unfolded Clos network are symmetric and are marked down together (if a given link is down, both its north bound and south bound components are down), the values for the link state matrix $L_{2S}$ 350 is obtained by transposing the link state matrix $L_{S2}$ 340 (transposing the matrix depicted above in Table 3 so that the four spine network devices are the columns and the eight second tier network devices are the rows). The following matrix multiplication (Calculation 3) calculates $T2_{NB}$ 326 using the link state matrix $L_{2S}$ 350 and the values calculated above in Calculation 2 for the reachability matrix S 324.

$$\begin{pmatrix} 1 & 0 & 1 & 0 \\ 0 & 0 & 0 & 1 \\ 0 & 0 & 0 & 0 \\ 0 & 0 & 0 & 1 \\ 1 & 0 & 1 & 0 \\ 0 & 0 & 0 & 1 \\ 1 & 0 & 1 & 0 \\ 0 & 0 & 0 & 1 \end{pmatrix} \times \begin{pmatrix} 0 \\ 0 \\ 0 \\ 1 \end{pmatrix} = \begin{pmatrix} 0 \\ 1 \\ 0 \\ 1 \\ 0 \\ 1 \\ 0 \\ 1 \end{pmatrix}$$

$$L_{2S} \times S = T2_{NB} \quad \text{Calculation 3}$$

According to Calculation 3 above, the reachability matrix $T2_{NB}$ 326 is the column of values (0 1 0 1 0 1 0 1), indicating that every other network device in the second tier 124 north bound can forward network devices to the destination (by way of Spine 4), which is depicted by the bold arrows from G1-T2-2, G2-T2-2, G3-T2-2, and G4-T2-2 to Spine 4. This result is depicted in FIG. 3 as the values in the dashed boxes at $T2_{NB}$ 326.

The equation used to calculate the next reachability matrix is:

$$T1_{NB} = L_{12} \times T2_{NB}$$

In other words, the reachability matrix for the first tier north bound ($T1_{NB}$ 328) is equal to the link state matrix ($L_{12}$ 360 indicating which links are up or down (or not present) between the first tier 126 and second tier 124 north bound) multiplied by the reachability matrix for the second tier north bound ($T2_{NB}$ 326). Because the links in the unfolded Clos network are symmetric and are marked down together (if a given link is down, both its north bound and south bound components are down), the values for the link state matrix $L_{12}$ 360 is obtained by transposing the link state matrix $L_{21}$ 330 (transposing the matrix depicted above in Table 2). The following matrix multiplication (Calculation 4) calculates $T1_{NB}$ 328 using the link state matrix $L_{12}$ 360 and the values calculated above in Calculation 3 for the reachability matrix $T2_{NB}$ 326.

$$\begin{pmatrix} 1 & 1 & 0 & 0 & 0 & 0 & 0 & 0 \\ 1 & 1 & 0 & 0 & 0 & 0 & 0 & 0 \\ 0 & 0 & 0 & 0 & 0 & 0 & 0 & 0 \\ 0 & 0 & 0 & 1 & 0 & 0 & 0 & 0 \\ 0 & 0 & 0 & 0 & 1 & 0 & 0 & 0 \\ 0 & 0 & 0 & 0 & 1 & 1 & 0 & 0 \\ 0 & 0 & 0 & 0 & 0 & 0 & 1 & 1 \\ 0 & 0 & 0 & 0 & 0 & 0 & 1 & 1 \end{pmatrix} \times \begin{pmatrix} 0 \\ 1 \\ 0 \\ 1 \\ 0 \\ 1 \\ 0 \\ 1 \end{pmatrix} = \begin{pmatrix} 1 \\ 1 \\ 0 \\ 1 \\ 0 \\ 1 \\ 1 \\ 1 \end{pmatrix}$$

$$L_{12} \times T2_{NB} = T1_{NB} \quad \text{Calculation 4}$$

According to Calculation 4 above, the reachability matrix $T1_{NB}$ 328 is the column of values (1 1 0 1 0 1 1 1), which is illustrated by the bold arrows from the first tier 126 north bound network devices (the beginning stage of the unfolded Clos network). This result is depicted in FIG. 3 as the values in the dashed boxes at $T1_{NB}$ 328.

In the same manner as described above with regard to the example 5-stage unfolded 3-tier Clos network (e.g., illustrated in FIG. 2 and FIG. 3), reachability matrices can be calculated for a tiered network (e.g., a Clos network or another type of tiered network) with any number of tiers, with any number of network devices per tier, and with various types of network connection strategies between devices of adjacent tiers.

A set of reachability matrices can be calculated for one or more destinations where the one or more destinations have the same reachability (the same unique connectivity pattern) from the last stage network devices (e.g., depicted at 127). For example, one set of reachability matrices is depicted in FIG. 3 for the specific destination TOR 3. Another set of reachability matrices can be calculated, for example, for the destinations TOR 1 and TOR 2, which would have the same $T1_{SB}$ reachability matrix (0 1 0 0 0 0 0 0).

In some implementations, a specific set of reachability matrices (defining reachability to one or more specific destinations) is referred to as a fabric forwarding equivalence class (FFEC). For example, with reference to the specific $T1_{SB}$ 320 reachability matrix, the FFEC is represented by the reachability matrix (0 0 1 1 0 0 0 0) for forwarding network traffic to the TOR 3 destination within the example Clos network. A specific FFEC can be uniquely identified by its last stage reachability matrix (e.g., the reachability matrix depicted at $T1_{SB}$ 320).

As discussed above, reachability matrices are defined for a specific destination (e.g., a specific unique connectivity pattern) and at a specific stage (a one column matrix). However, in some implementations, a reachability matrix is extended to support a plurality of different destination groups (a plurality of different unique connectivity patterns). In such implementations, an M×N extended reachability matrix R is generated for a given stage, defined for M routers and N destinations at the given stage. The M×N reachability matrix represents whether each network device of the given stage can reach each of the destinations for the different unique connectivity patterns. For each i and j, where $1 \le i \le M$ and $1 \le j \le N$, R[i, j] is 1 if and only if the i-th network device can reach the j-th destination (as represented by a unique connectivity pattern). By using extended reachability matrices, the overall number of matrix multiplications needed for calculating reachability to M destinations can be reduced by a factor of M.

Methods for Calculating Reachability Matrices

In any of the technologies described herein, methods can be provided for calculating reachability matrices for multi-stage networks. For example, reachability matrices can be calculated for one or more destination devices connected to the multi-stage network (e.g., TOR network devices) using matrix multiplication operations. For example, connectivity information (e.g., link status information and/or other topology or connection information regarding the multi-stage network) can be obtained and used to determine link state matrices. Reachability matrices can then be calculated for specific destination devices using the link state matrices.

Figure 4:
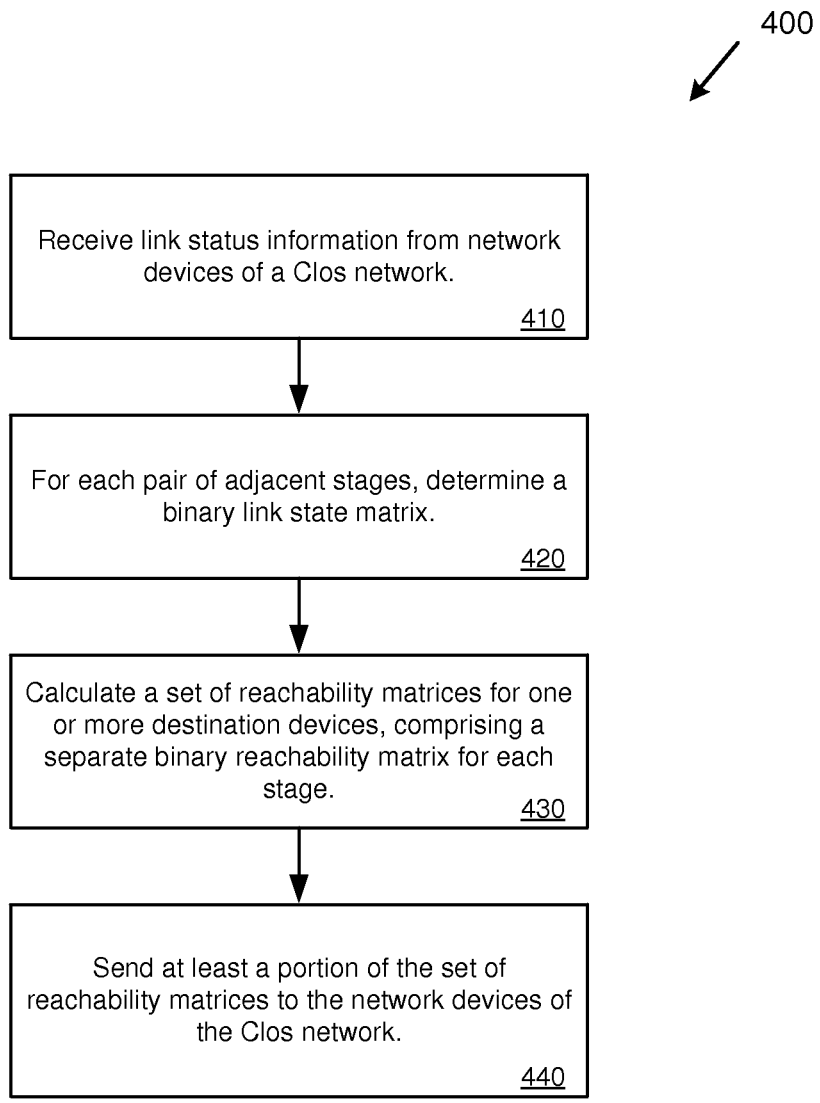
FIGS. 4, 5, and 6 are flowcharts of example methods for calculating reachability matrices for Clos networks.

FIG. 4 is a flow chart of an example method 400 for calculating reachability matrices for a Clos network (or for another type of tiered network) by a controller device, such as controller 110. The Clos network comprises a plurality of tiers, with each tier comprising a plurality of network devices (routers and/or switches). The Clos network is represented by an unfolded Clos network having a plurality of stages. For example, a 3-tier Clos network is represented as an unfolded Clos network with 5 stages.

At 410, link status information is received from network devices of the Clos network. For example, each network device of the Clos network can provide information (e.g., to the controller device) indicating link status (e.g., for links directly connected to the network device). For example, the link status information can indicate links that are up and/or links that are down. In some implementations, link status information represents the status of bi-directional links which are marked up or down for both directions of the link. In some implementations, link status information represents up and down status for each direction independently. In some implementations, additional connectivity information is received (e.g., information indicating the Clos topology and/or information indicating which destination devices are connected to which network devices of the Clos network).

At 420, a binary link state matrix is determined for each pair of adjacent stages of the Clos network using, at least in part, the link status information. For example, if the Clos network has 5 stages in an unfolded representation, then four binary link state matrices would be determined, one between stages 1 and 2 (representing which links are up or down (or not present) between the devices of the first and second stages), one between stages 2 and 3, one between stages 3 and 4, and one between stages 4 and 5.

At 430, a set of reachability matrices is calculated for one or more destination devices. The set of reachability matrices comprises a separate binary reachability matrix for each stage. The set of reachability matrices can be calculated beginning with the final stage and moving backward to the first stage.

At 440, at least a portion of the set of reachability matrices are sent to the network devices of the Clos network. For example, a reachability matrix for a particular stage can be sent to the network devices in that stage as well as to network devices of adjacent stages. The network devices of the Clos network use the reachability matrices to make network packet forwarding decisions when sending network packets to the one or more destination devices. For example, the network devices use the reachability matrices to determine the next hop for sending packets to the one or more destination devices.

Figure 5:
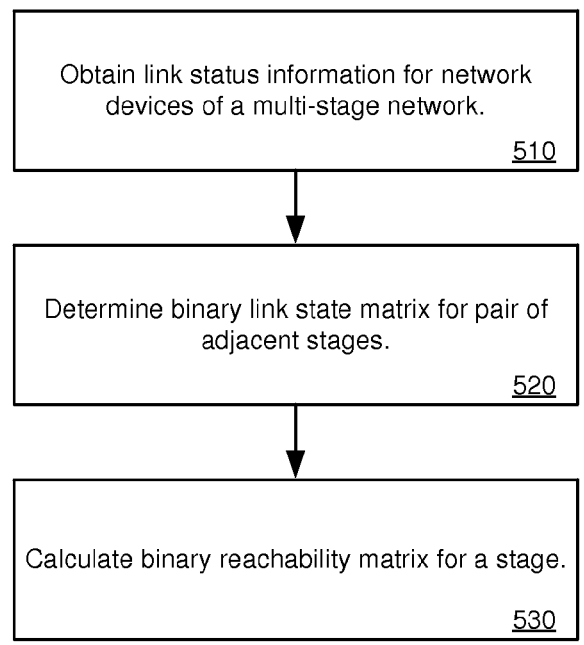

FIG. 5 is a flow chart of an example method 500 for calculating one or more reachability matrices for a multi-stage network (e.g., a Clos network or another type of tiered network). The example method 500 can be performed by a controller device, such as controller 110 and/or by network devices (routers and/or switches) of the multi-stage network. The multi-stage network comprises a plurality of stages, with each stage comprising a plurality of network devices.

At 510, link status information is obtained for one or more network devices of the multi-stage network. For example, a controller device can obtain link status information from network devices of the multi-stage network and/or individual network devices of the multi-stage network can obtain link status information. In some implementations, additional connectivity information is obtained (e.g., information indicating the topology of the multi-stage network and/or information indicating which destination devices are connected to which network devices of the multi-stage network).

At 520, a binary link state matrix is determined for a pair of adjacent stages of the multi-stage network using, at least in part, the link status information.

At 530, a binary reachability matrix is calculated for a stage of the multi-stage network. The binary reachability matrix represents which network devices of the stage can forward network packets to the one or more destination devices. In some implementations, additional binary reachability matrices are calculated to create a set of reachability matrices, one for each stage.

Figure 6:
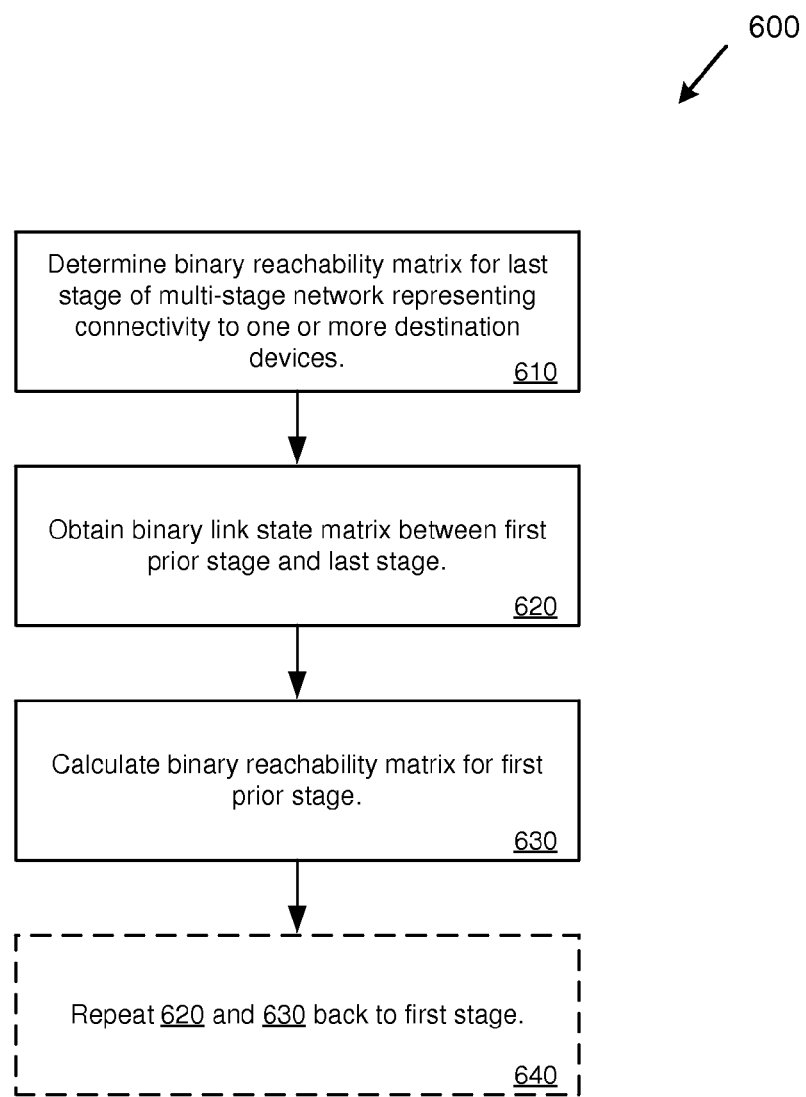

FIG. 6 is a flow chart of an example method 600 for calculating one or more reachability matrices for a multi-stage network (e.g., a Clos network or another type of tiered network). The example method 600 can be performed by a controller device, such as controller 110 and/or by network devices (routers and/or switches) of the multi-stage network. The multi-stage network comprises a plurality of stages, with each stage comprising a plurality of network devices.

At 610, a binary reachability matrix is calculated for a last stage of the multi-stage network (e.g., the last stage of a tiered network in the south bound, or downlink, direction). The binary reachability matrix represents which network devices of the last stage can forward network packets to one or more destination devices that are connected to the last stage. For example, with reference to FIG. 3, the binary reachability matrix for the TOR 3 destination device from the last stage 127 would be (0 0 1 1 0 0 0 0), indicating that network devices G2-T1-1 and G2-T1-2 can forward network packets to TOR 3. As another example, the binary reachability matrix for the TOR 1 and TOR 2 destination devices would be (0 1 0 0 0 0 0 0), indicating that the network device G1-T1-2 can forward network packets to TOR 1 and TOR 2.

At 620, a binary link state matrix is obtained representing connectivity between a first prior stage and the last stage. With reference to FIG. 3, the first prior stage would be 125. In some implementations, the binary link state matrix is determined from link status information obtained for one or more network devices of the multi-stage network. For example, a controller device can obtain link status information from network devices of the multi-stage network and/or individual network devices of the multi-stage network can obtain link status information. In some implementations, additional connectivity information is obtained (e.g., information indicating the topology of the multi-stage network).

At 630, a binary reachability matrix is calculated for the first prior stage. The binary reachability matrix represents which network devices of the first prior stage can forward network packets to the one or more destination devices. The network devices of the first prior stage that can forward network packets to the one or more destination devices can use the binary link state matrix obtained at 620 and the binary reachability matrix determined at 610 to decide which network devices in the last stage to use as the next hop when forwarding network packets to the one or more destination devices.

In some implementations, the method proceeds to 640, where the operations depicted at 620 and 630 are repeated for previous pairs of stages back to the first stage. In this manner, a set of reachability matrices can be calculated for the multi-stage network for the one or more destination devices.

In addition, the example method 600 can be performed for each connectivity scenario of destination devices. For example, a set of reachability matrices can be calculated for each unique last stage reachability matrix so that the network devices of the multi-stage network can determine where to forward network packets for any given destination reachable via the multi-stage network. With reference to FIG. 3, a first set of reachability matrices can be calculated for TOR 1 and TOR 2 (represented by last stage reachability matrix (0 1 0 0 0 0 0 0)), a second set of reachability matrices can be calculated for TOR 3 (represented by last stage reachability matrix (0 0 1 1 0 0 0 0), and a third set of reachability matrices can be calculated for TOR 4 (represented by last stage reachability matrix (0 0 0 0 1 1 1 0)).

Example Service Provider Environments

Figure 7:
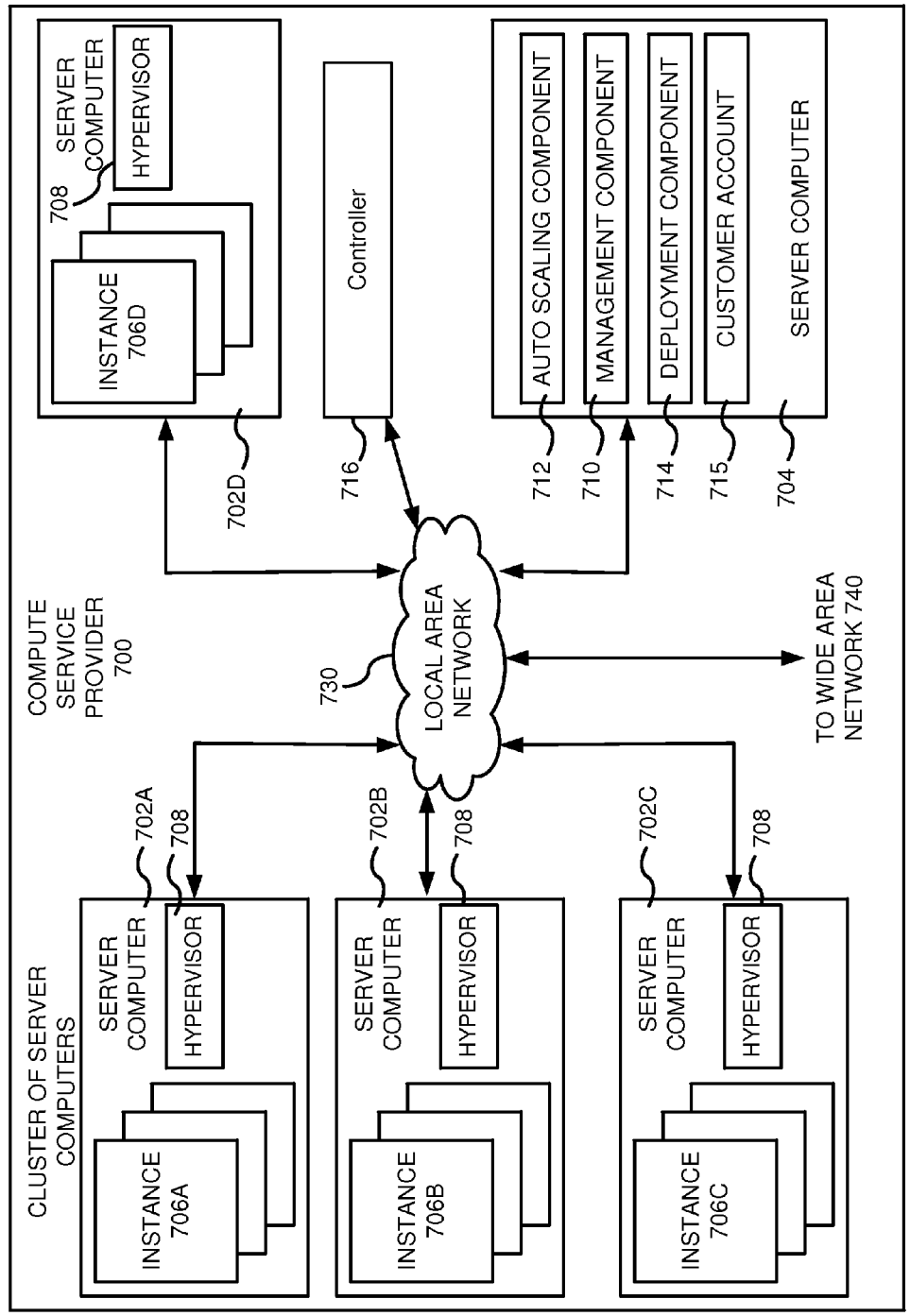
FIG. 7 is an example system diagram showing a plurality of virtual machine instances running in a multi-tenant environment.

FIG. 7 is a computing system diagram of a network-based compute service provider 700 that illustrates one environment in which embodiments described herein can be used. By way of background, the compute service provider 700 (i.e., the cloud provider) is capable of delivery of computing and storage capacity as a service to a community of end recipients. In an example embodiment, the compute service provider can be established for an organization by or on behalf of the organization. That is, the compute service provider 700 may offer a "private cloud environment." In another embodiment, the compute service provider 700 supports a multi-tenant environment, wherein a plurality of customers operate independently (i.e., a public cloud environment). Generally speaking, the compute service provider 700 can provide the following models: Infrastructure as a Service ("IaaS"), Platform as a Service ("PaaS"), and/or Software as a Service ("SaaS"). Other models can be provided. For the IaaS model, the compute service provider 700 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 700 using networked client devices, such as desktop computers, laptops, tablets, smartphones, etc. running web browsers or other lightweight client applications. Those skilled in the art will recognize that the compute service provider 700 can be described as a "cloud" environment.

The particular illustrated compute service provider 700 includes a plurality of server computers 702A-702D. While only four server computers are shown, any number can be used, and large centers can include thousands of server computers. The server computers 702A-702D can provide computing resources for executing software instances 706A-706D. In one embodiment, the instances 706A-706D are virtual machines. As known in the art, a virtual machine is an instance of a software implementation of a machine (i.e. a computer) that executes applications like a physical machine. In the example, each of the servers 702A-702D can be configured to execute a hypervisor 708 or another type of program configured to enable the execution of multiple instances 706 on a single server. For example, each of the servers 702A-702D can be configured (e.g., via the hypervisor 708) to support one or more virtual machine slots, with each virtual machine slot capable of running a virtual machine instance (e.g., server computer 702A could be configured to support three virtual machine slots each running a corresponding virtual machine instance). Additionally, each of the instances 706 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 704 can be reserved for executing software components for managing the operation of the server computers 702 and the instances 706. For example, the server computer 704 can execute a management component 710. A customer can access the management component 710 to configure various aspects of the operation of the instances 706 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 712 can scale the instances 706 based upon rules defined by the customer. In one embodiment, the auto scaling component 712 allows a customer to specify scale-up rules for use in determining when new instances should be instantiated and scale-down rules for use in determining when existing instances should be terminated. The auto scaling component 712 can consist of a number of subcomponents executing on different server computers 702 or other computing devices. The auto scaling component 712 can monitor available computing resources over an internal management network and modify resources available based on need.

A deployment component 714 can be used to assist customers in the deployment of new instances 706 of computing resources. The deployment component can have access to account information associated with the instances, such as who is the owner of the account, credit card information, country of the owner, etc. The deployment component 714 can receive a configuration from a customer that includes data describing how new instances 706 should be configured. For example, the configuration can specify one or more applications to be installed in new instances 706, provide scripts and/or other types of code to be executed for configuring new instances 706, provide cache logic specifying how an application cache should be prepared, and other types of information. The deployment component 714 can utilize the customer-provided configuration and cache logic to configure, prime, and launch new instances 706. The configuration, cache logic, and other information may be specified by a customer using the management component 710 or by providing this information directly to the deployment component 714. The instance manager can be considered part of the deployment component.

Customer account information 715 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 730 can be utilized to interconnect the server computers 702A-702D and the server computer 704. The network 730 can comprise a multi-stage network (e.g., a Clos network fabric and/or another type of tiered network fabric) and network devices outside the multi-stage network (e.g., top-of-rack switches, routers, etc.). The network 730 can be a local area network (LAN) and can be connected to a Wide Area Network (WAN) 740 so that end users can access the compute service provider 700. It should be appreciated that the network topology illustrated in FIG. 7 has been simplified and that many more networks and networking devices can be utilized to interconnect the various computing systems disclosed herein.

In some implementations, a controller 716 manages a multi-stage network (part of the local area network 730). For example, the multi-stage network can connect to TOR devices (e.g., network switches) that service the server computers 720A-720D. The controller 716 can receive link status information from the network devices of the multi-stage network, determine binary link state matrices, and calculate a set of reachability matrices for various destination devices.

Figure 8:
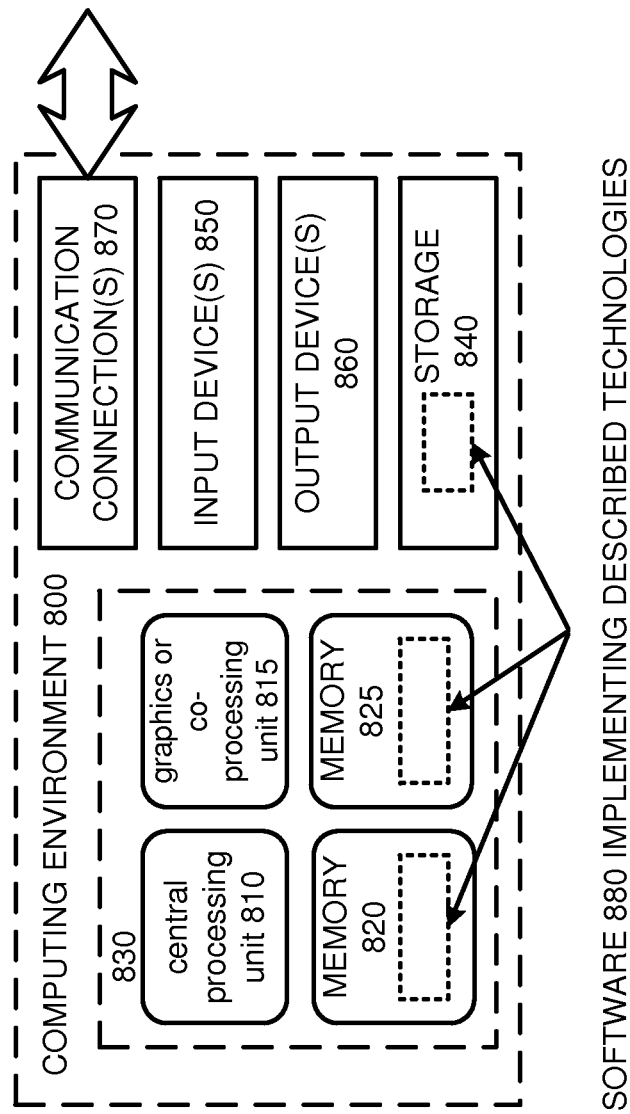
FIG. 8 depicts a generalized example of a suitable computing environment in which the described innovations may be implemented.

FIG. 8 depicts a generalized example of a suitable computing environment 800 in which the described innovations may be implemented. The computing environment 800 is not intended to suggest any limitation as to scope of use or functionality, as the innovations may be implemented in diverse general-purpose or special-purpose computing systems. For example, the computing environment 800 can be any of a variety of computing devices (e.g., desktop computer, laptop computer, server computer, tablet computer, etc.)

With reference to FIG. 8, the computing environment 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing environment 800 includes storage 840, one or more input devices 850, one or more output devices 860, and one or more communication connections 870. An interconnection mechanism (not shown) such as a bus, controller, or network interconnects the components of the computing environment 800. Typically, operating system software (not shown) provides an operating environment for other software executing in the computing environment 800, and coordinates activities of the components of the computing environment 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing environment 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing environment 800. The output device(s) 860 may be a display, printer, speaker, CD-writer, or another device that provides output from the computing environment 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. Therefore, what is claimed as the invention is all that comes within the scope of these claims.

What is claimed is:

1. A method, implemented by a controller device, for calculating reachability matrices for a multi-stage network comprising a plurality of tiers, the method comprising:
    receiving, by the controller device, link status information from network devices of the multi-stage network, wherein each tier, of the plurality of tiers, comprises a plurality of network devices, wherein each network device is a switch or a router, and wherein the multi-stage network is represented by an unfolded multi-stage network having a plurality of stages;
    for each pair of adjacent stages, of the plurality of stages:
        determining, by the controller, a binary link state matrix between the pair of adjacent stages from the link status information;
    calculating, by the controller using one or more matrix multiplication operations, a set of reachability matrices for one or more destination devices, wherein the set of reachability matrices comprises a separate binary reachability matrix for each stage, of the plurality of stages, representing which network devices of the stage can forward network packets to the one or more destination devices; and
    sending, by the controller device, the set of reachability matrices to the network devices of the multi-stage network;
    wherein the network devices of the multi-stage network use the set of reachability matrices to make network packet forwarding decisions for the one or more destination devices.

2. The method of claim 1 wherein the link status information comprises indications of whether respective network connections are up or down between the network devices.

3. The method of claim 1 wherein, for each pair of adjacent stages, the binary link state matrix contains a matrix entry for each combination of network devices from the adjacent stages, the matrix entry set to:
    a first value when a network connection is up between the combination of network devices; and
    a second value, different from the first value, when the network connection is down or not present between the combination of network devices.

4. The method of claim 1 wherein the one or more destination devices are defined by a unique connectivity pattern of network devices in a last stage of the plurality of stages.

5. The method of claim 1 wherein a separate set of reachability matrices is calculated for each group of one or more destination devices having a unique connectivity pattern of network devices in a last stage of the plurality of stages.

6. The method of claim 1 wherein the sending the set of reachability matrices to the network devices of the multi-stage network comprises:
    for the network devices of each stage of the plurality of stages:
        sending a binary reachability matrix for the stage; and
        sending a binary reachability matrix for an adjacent stage.

7. The method of claim 1 wherein the controller device connects to the network devices of the multi-stage network via one or more management links.

8. A computing device comprising:
one or more processing units;
wherein the computing device is configured to perform operations for calculating reachability matrices for a multi-stage network comprising a plurality of stages, the operations comprising:
obtaining link status information for one or more network devices of the multi-stage network, wherein the link status information comprises indications of whether network connections are up or down between the one or more network devices;
determining a binary link state matrix representing connectivity between a pair of adjacent stages of the plurality of stages; and
calculating, using one or more matrix multiplication operations, a binary reachability matrix for a stage, of the plurality of stages, the binary reachability matrix representing which network devices of the stage can forward network packets to one or more destination devices;
wherein the binary reachability matrix is used to make network packet forwarding decisions for the one or more destination devices.

9. The computing device of claim 8 further comprising a graphics processing unit (GPU), and wherein the matrix multiplication operations are performed, at least in part, by the GPU.

10. The computing device of claim 8 wherein each stage, of the plurality of stages, of the multi-stage network comprises a plurality of network devices, wherein each network device is a switch or a router.

11. The computing device of claim 8 wherein the binary link state matrix contains a matrix entry for each combination of network devices from the pair of adjacent stages, the matrix entry set to:
a first value when a network connection is up between the combination of network devices; and
a second value, different from the first value, when the network connection is down or not present between the combination of network devices.

12. The computing device of claim 8 wherein the one or more destination devices are defined by a unique connectivity pattern of network devices in a last stage of the plurality of stages.

13. The computing device of claim 8 the operations further comprising:
calculating, using one or more matrix multiplication operations, a binary reachability matrix for each remaining stage, of the plurality of stages, to generate a set of reachability matrices representing reachability from all stages of the multi-stage network to the one or more destination devices.

14. The computing device of claim 8 wherein the computing device is a controller device that is an external device connected to network devices of the multi-stage network via one or more management links.

15. The computing device of claim 8 wherein the binary reachability matrix is an extended binary reachability matrix that represents which network devices of the stage can forward network packets to different groups of one or more destination devices, including the one or more destination devices, and wherein each group of one or more destination devices is defined by a unique connectivity pattern of network devices in a last stage of the plurality of stages.

16. A computer-readable storage medium storing computer-executable instructions for causing a computing device to perform operations for calculating reachability matrices for a multi-stage network comprising a plurality of stages, the operations comprising:
determining, for a last stage, of the plurality of stages, a binary reachability matrix representing which network devices of the last stage can forward network packets to one or more destination devices that are connected to the last stage;
obtaining a binary link state matrix representing connectivity between a first prior stage, of the plurality of stages, and the last stage, wherein the first prior stage is adjacent to the last stage; and
calculating, using one or more matrix multiplication operations, a binary reachability matrix for the first prior stage representing which network devices of the first prior stage can forward network packets to the one or more destination devices;
wherein network devices of the first prior stage use the binary reachability matrix for the last stage and the binary reachability matrix for the first prior stage to make network packet forwarding decisions for the one or more destination devices.

17. The computer-readable storage medium of claim 16, the operations further comprising:
obtaining link status information for network devices of the last stage and the first prior stage, wherein the binary link state matrix is determined based at least in part on the link status information.

18. The computer-readable storage medium of claim 16, the operations further comprising:
obtaining a binary link state matrix representing connectivity between a second prior stage, of the plurality of stages, and the first prior stage, wherein the second prior stage is adjacent to the first prior stage; and
calculating, using one or more matrix multiplication operations, a binary reachability matrix for the second prior stage representing which network devices of the second prior stage can forward network packets to the one or more destination devices.

19. The computer-readable storage medium of claim 18, further comprising:
obtaining binary link state matrices and calculating binary reachability matrices for all remaining stages of the multi-stage network back to a beginning stage.

20. The computer-readable storage medium of claim 16, wherein the binary link state matrix contains a matrix entry for each combination of network devices from the last stage and the first prior stage, the matrix entry set to:
a first value when a network connection is up between the combination of network devices; and
a second value, different from the first value, when the network connection is down or not present between the combination of network devices.

* * * * *